(12) United States Patent
Imura

(10) Patent No.: US 12,140,179 B2
(45) Date of Patent: Nov. 12, 2024

(54) SLIDING COMPONENT

(71) Applicant: EAGLE INDUSTRY CO., LTD., Tokyo (JP)

(72) Inventor: Tadatsugu Imura, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 75 days.

(21) Appl. No.: 17/913,154

(22) PCT Filed: Mar. 24, 2021

(86) PCT No.: PCT/JP2021/012316
§ 371 (c)(1),
(2) Date: Sep. 20, 2022

(87) PCT Pub. No.: WO2021/193743
PCT Pub. Date: Sep. 30, 2021

(65) Prior Publication Data
US 2023/0151848 A1 May 18, 2023

(30) Foreign Application Priority Data

Mar. 26, 2020 (JP) .................................. 2020-055785

(51) Int. Cl.
*F16C 17/04* (2006.01)
*F16J 15/34* (2006.01)

(52) U.S. Cl.
CPC ......... *F16C 17/045* (2013.01); *F16J 15/3424* (2013.01)

(58) Field of Classification Search
CPC .... F16C 17/045; F16J 15/3412; F16J 15/3424
See application file for complete search history.

(56) References Cited

U.S. PATENT DOCUMENTS

| | | | |
|---|---|---|---|
| 2,247,505 A | 7/1941 | Kohler | F16J 15/342 |
| 3,147,013 A | 9/1964 | Tracy | F04D 29/126 |
| 3,957,276 A | 5/1976 | Wiese | F16J 15/3412 |

(Continued)

FOREIGN PATENT DOCUMENTS

| | | | | |
|---|---|---|---|---|
| CN | 1215135 A | * | 4/1999 | ........... F16J 15/3412 |
| CN | 101975274 A | * | 2/2011 | ........... F16J 15/3404 |

(Continued)

OTHER PUBLICATIONS

International Preliminary Report on Patentability issued in PCT/JP2021/007813, dated Sep. 6, 2022, 6 pages.

(Continued)

*Primary Examiner* — Phillip A Johnson
(74) *Attorney, Agent, or Firm* — HAYES SOLOWAY P.C.

(57) ABSTRACT

In an annular sliding component disposed at a relatively rotating position of a rotating machine and sliding relative to an opposed sliding component, a sliding surface is provided with a plurality of first dynamic pressure generation grooves disposed on a leakage side, having terminating ends, and generating a positive pressure and a plurality of second dynamic pressure generation grooves disposed on a sealing target fluid side, having terminating ends, and generating a positive pressure and a depth of the second dynamic pressure generation groove is shallower than a depth of the first dynamic pressure generation groove.

20 Claims, 11 Drawing Sheets

(56) References Cited

U.S. PATENT DOCUMENTS

| | | | | |
|---|---|---|---|---|
| 6,152,452 | A * | 11/2000 | Wang | F16J 15/3412 |
| | | | | 277/400 |
| 6,485,021 | B1 | 11/2002 | Osaki | F16J 15/3412 |
| 7,258,346 | B2 | 8/2007 | Tejima | F16J 15/3412 |
| 9,353,867 | B2 | 5/2016 | Itadani et al. | F16J 15/3448 |
| 9,714,712 | B2 * | 7/2017 | Kiernan | F16J 15/3412 |
| 11,009,072 | B2 | 5/2021 | Kimura et al. | F16J 15/34 |
| 2005/0094906 | A1 * | 5/2005 | Satoh | F16C 17/045 |
| | | | | 310/90 |
| 2013/0209011 | A1 | 8/2013 | Tokunaga | F16J 32/0633 |
| 2014/0197600 | A1 | 7/2014 | Hosoe et al. | F16J 15/40 |
| 2015/0377360 | A1 | 12/2015 | Itadani et al. | F16J 15/3488 |
| 2017/0002930 | A1 | 1/2017 | Itadani et al. | F16J 15/3412 |
| 2017/0102074 | A1 | 4/2017 | Itadani et al. | F16J 15/34 |
| 2018/0073394 | A1 * | 3/2018 | Tokunaga | F16J 15/3412 |
| 2018/0195618 | A1 * | 7/2018 | Itadani | F16J 15/342 |
| 2021/0080009 | A1 | 3/2021 | Kimura | F16J 15/3412 |
| 2022/0099188 | A1 | 3/2022 | Imura et al. | F16J 15/3412 |
| 2022/0099191 | A1 * | 3/2022 | Suzuki | F16C 33/103 |
| 2022/0106980 | A1 | 4/2022 | Imura et al. | F16C 17/026 |
| 2022/0120315 | A1 | 4/2022 | Ou | F16C 17/045 |
| 2022/0128088 | A1 | 4/2022 | Suzuki | F16C 33/107 |
| 2022/0145992 | A1 | 5/2022 | Miyazaki | F16C 33/107 |

FOREIGN PATENT DOCUMENTS

| | | | |
|---|---|---|---|
| DE | 3819566 A1 * | 12/1989 | |
| EP | 0672852 | 9/1995 | F16J 15/34 |
| EP | 3284981 | 7/2018 | F16J 15/34 |
| EP | 3680519 | 7/2020 | F16J 15/34 |
| EP | 3889474 | 10/2021 | F16J 15/34 |
| EP | 3922876 | 12/2021 | F16J 17/04 |
| EP | 4177488 | 5/2023 | F16C 17/04 |
| EP | 4177500 | 5/2023 | F16J 15/16 |
| JP | S59231268 | 12/1984 | F16J 15/34 |
| JP | S59231269 | 12/1984 | F16J 15/34 |
| JP | S6231775 | 2/1987 | F16J 15/34 |
| JP | 2020173020 | 10/2020 | F16J 15/34 |
| KR | 10-2019-0108569 | 9/2019 | F16C 13/10 |
| WO | 2012046749 | 4/2012 | F16J 15/34 |
| WO | 2013035502 | 3/2013 | F16J 15/34 |
| WO | 2014148317 | 9/2014 | F16J 15/34 |
| WO | 2015087800 | 6/2015 | F16J 15/34 |
| WO | 2015199172 | 12/2015 | F16J 15/34 |
| WO | 2016167262 | 10/2016 | F16J 15/34 |
| WO | 2019049847 | 3/2019 | F16J 15/34 |
| WO | WO2019221226 | 11/2019 | F16J 15/18 |
| WO | 2020162348 | 8/2020 | F16C 17/04 |
| WO | 2020162349 | 8/2020 | F16C 17/04 |
| WO | 2020166589 | 8/2020 | F16C 17/04 |

OTHER PUBLICATIONS

International Search Report and Written Opinion issued in PCT/JP2021/007813, dated May 18, 2021, with English translation, 15 pages.

International Preliminary Report on Patentability issued in PCT/JP2021/012316, dated Sep. 22, 2022, 6 pages.

International Search Report and Written Opinion issued in PCT/JP2021/012316, dated Jun. 8, 2021, with English translation, 15 pages.

Official Action issued in related U.S. Appl. No. 17/908,515, dated Dec. 7, 2023, 7 pages.

European Search Report issued in related application serial No. 21767086.8, dated Mar. 27, 2024, 10 pages.

European Search Report issued in related application serial No. 201793420.7, dated Apr. 22, 2024, 8 pages.

International Preliminary Report on Patentability issued in PCT/JP2021/014347, dated Oct. 25, 2022, 4 pages.

International Search Report and Written Opinion issued in PCT/JP2021/014347, dated Jun. 8, 2021, with English translation, 11 pages.

European Search Report issued in related application serial No. 21793420.7, dated Apr. 22, 2024, 8 pages.

U.S. Appl. No. 17/908,515, filed Aug. 31, 2022, Imura.

U.S. Appl. No. 17/920,009, filed Oct. 19, 2022, Negishi et al.

Official Action issued in related U.S. Appl. No. 17/920,009, dated Apr. 29, 2024, 9 pages.

European Search Report issued in related application serial No. 21777089.0, dated Mar. 14, 2024, 8 pages.

Korean Official Action issued in related application serial No. 10-2022-7032878, dated May 3, 2024, with translation 11 pages.

Korean Official Action issued in related application serial No. 10-2022-7031184, dated Apr. 25, 2024, with translation, 8 pages.

* cited by examiner (a)

(b)

(c)

SLIDING COMPONENT

TECHNICAL FIELD

The present invention relates to sliding components that rotate relative to each other and are used for, for example, a shaft sealing device shaft-sealing a rotary shaft of a rotating machine in an automotive seal field, a general industrial machinery seal field, or another seal field or a bearing of a machine in an automotive bearing field, a general industrial machinery bearing field, or another bearing field.

BACKGROUND ART

As a shaft sealing device that prevents a leakage of a sealing target fluid, for example, a mechanical seal includes a pair of annular sliding components rotating relative to each other so that sliding surfaces slide on each other. In such a mechanical seal, there has been a recent demand to reduce the energy lost caused by sliding for environmental measures and the like.

For example, in a mechanical seal shown in Patent Citation 1, a pair of annular sliding components is configured to rotate relative to each other, a sealing target fluid exists in an outer space, and a low-pressure fluid exists in an inner space. One sliding component is provided with a spiral groove communicating with the inner space in which the low-pressure fluid exists, extending in an arc shape from an inner radial end to an outer radial side while being inclined in a circumferential direction, and having a closed terminating end on the downstream side of a relative rotation direction. Accordingly, since the low-pressure fluid is introduced into the spiral groove of one sliding component during the relative rotation of the pair of sliding components, a positive pressure is generated in the terminating end and the vicinity thereof to slightly separate sliding surfaces of the pair of sliding components from each other. Accordingly, low friction is realized. Further, in the spiral groove, since a negative pressure is generated in the starting end and the vicinity thereof to suck a sealing target fluid flowing from the outer space between the sliding surfaces, it is possible to prevent the sealing target fluid from leaking to the low-pressure inner space from between the pair of sliding components.

CITATION LIST

Patent Literature

Patent Citation 1: JP S62-31775 A (Pages 2 and 3, FIG. 2)

SUMMARY OF INVENTION

Technical Problem

However, in the sliding component shown in Patent Citation 1, since the spiral groove is disposed on the leakage side of one sliding component and extends from the inner radial end toward the outer radial side to introduce the low-pressure fluid, it is possible to reduce wear and suppress leakage. However, since a sufficient dynamic pressure is not generated in the spiral groove until the sliding component reaches a high-speed rotation state of a certain level or more, it takes time to separate the sliding surfaces. As a result, there is a risk that the sliding surface would wear out.

The present invention has been made in view of such problems and an object thereof is to provide a sliding component capable of suppressing wear between sliding surfaces from the start of a relative rotation of a pair of sliding components to a high-speed rotation and suppressing a leakage of a sealing target fluid.

Solution to Problem

In order to solve the foregoing problems, a sliding component according to the present invention is a sliding component formed in an annular shape and disposed at a relatively rotating position of a rotating machine and sliding relative to an opposed sliding component, wherein a sliding surface of the sliding component is provided with a plurality of first dynamic pressure generation grooves disposed on a leakage side, having terminating ends, and generating a positive pressure and a plurality of second dynamic pressure generation grooves disposed on a sealing target fluid side, having terminating ends, and generating a positive pressure, and wherein a depth of the second dynamic pressure generation groove is shallower than a depth of the first dynamic pressure generation groove. According to the aforesaid feature of the present invention, since the depth of the second dynamic pressure generation groove is shallower than the depth of the first dynamic pressure generation groove, a second force caused by the positive pressure generated by the sealing target fluid in the second dynamic pressure generation groove mainly acts to separate the sliding surfaces from each other during the low-speed relative rotation of the sliding component. As the relative rotation speed of the sliding component increases, a first force caused by the positive pressure generated by the leakage side fluid in the first dynamic pressure generation groove suddenly increases. Then, when the relative rotation speed of the sliding component becomes sufficiently high, the first force becomes larger than the second force and the first force mainly acts to separate the sliding surfaces from each other. Accordingly, it is possible to suppress the wear between the sliding surfaces from the low speed to the high speed of the relative rotation of the pair of sliding components. Further, since a gap formed between the sliding surfaces increases during the high-speed relative rotation of the sliding component, the positive pressure is not easily generated in the second dynamic pressure generation groove. Accordingly, the first force caused by the positive pressure generated in the first dynamic pressure generation groove mainly acts to stably separate the sliding surfaces from each other. Thus, it is possible to suppress the wear by separating the sliding surfaces from each other from the start of the relative rotation of the pair of sliding components to the high-speed rotation. Further, since the second dynamic pressure generation groove sucks the sealing target fluid flowing from the sealing target fluid side space between the sliding surfaces, it is possible to prevent the sealing target fluid from leaking to the leakage side space from between the pair of sliding components.

It may be preferable that each of the second dynamic pressure generation grooves communicates with a sealing target fluid side space. According to this preferable configuration, it is possible to easily introduce the sealing target fluid into the second dynamic pressure generation groove and to generate a positive pressure at an early time.

It may be preferable that an annular land portion having a predetermined radial width or more is continuously provided in a circumferential direction between the terminating ends of the first dynamic pressure generation grooves and the terminating ends of the second dynamic pressure generation grooves. According to this preferable configuration, it is possible to suppress the sealing target fluid between the sliding surfaces from flowing to the leakage side space by the land portion when the sliding surfaces are separated from each other by the second force caused by the positive pressure generated in the second dynamic pressure generation groove. Further, it is possible to suppress the leakage of the sealing target fluid to the leakage side space in a stationary state in which the pair of sliding components does not rotate relative to each other.

It may be preferable that a radial center of the land portion is disposed on a side of the sealing target fluid with respect to a radial center of the sliding surface. According to this preferable configuration, since the land portion is disposed on the sealing target fluid side in the radial direction of the sliding surface, it is possible to ensure the long extension length of the first dynamic pressure generation groove and to arrange a large number of the first dynamic pressure generation grooves side by side. Accordingly, since the first dynamic pressure generation groove serves as a main dynamic pressure generation source compared to the second dynamic pressure generation groove, it is possible to suppress the leakage of the sealing target fluid to the leakage side space.

It may be preferable that each of the terminating ends of the second dynamic pressure generation grooves is provided with a wall portion which extends from a bottom surface of each of the second dynamic generation grooves toward the sliding surface. According to this preferable configuration, since the sealing target fluid concentrates on the wall portion of the terminating end of the second dynamic pressure generation groove during the relative rotation of the sliding component, it is possible to reliably generate a positive pressure in the vicinity of the terminating end.

It may be preferable that each of the second dynamic pressure generation grooves has an extension length than an extension length of each of the first dynamic pressure generation grooves. According to this preferable configuration, it is possible to generate a high positive pressure in the first dynamic pressure generation groove during the high-speed relative rotation of the pair of sliding components and to generate a positive pressure at an early time in the second dynamic pressure generation groove during the low-speed relative rotation.

It may be preferable that each of the second dynamic pressure generation grooves extends from the sealing target fluid side to the leakage side to be inclined in a circumferential direction. According to this preferable configuration, it is possible to easily introduce the sealing target fluid into the second dynamic pressure generation groove and to generate a positive pressure at an early time during the relative rotation of the pair of sliding components.

It may be preferable that each of the first dynamic pressure generation grooves extends from the leakage side to the sealing target fluid side to be inclined in the circumferential direction and each of the second dynamic pressure generation grooves is inclined along the circumferential direction compared to each of the first dynamic pressure generation grooves. According to this preferable configuration, since it is possible to easily introduce the sealing target fluid into the second dynamic pressure generation groove when the relative rotation of the sliding component starts, it is possible to generate a positive pressure in the second dynamic pressure generation groove at an early time.

It may be preferable that each of the second dynamic pressure generation grooves is disposed on an outer radial side of the sliding surface. According to this preferable configuration, since the second dynamic pressure generation groove is disposed at a position in which the circumferential speed of the relative rotation of the sliding component is fast, it is possible to easily introduce the sealing target fluid into the second dynamic pressure generation groove when the relative rotation of the sliding component starts.

In addition, the sealing target fluid may be a gas or a liquid or may be a mist in which a liquid and a gas are mixed.

DESCRIPTION OF EMBODIMENTS

Figure 1:
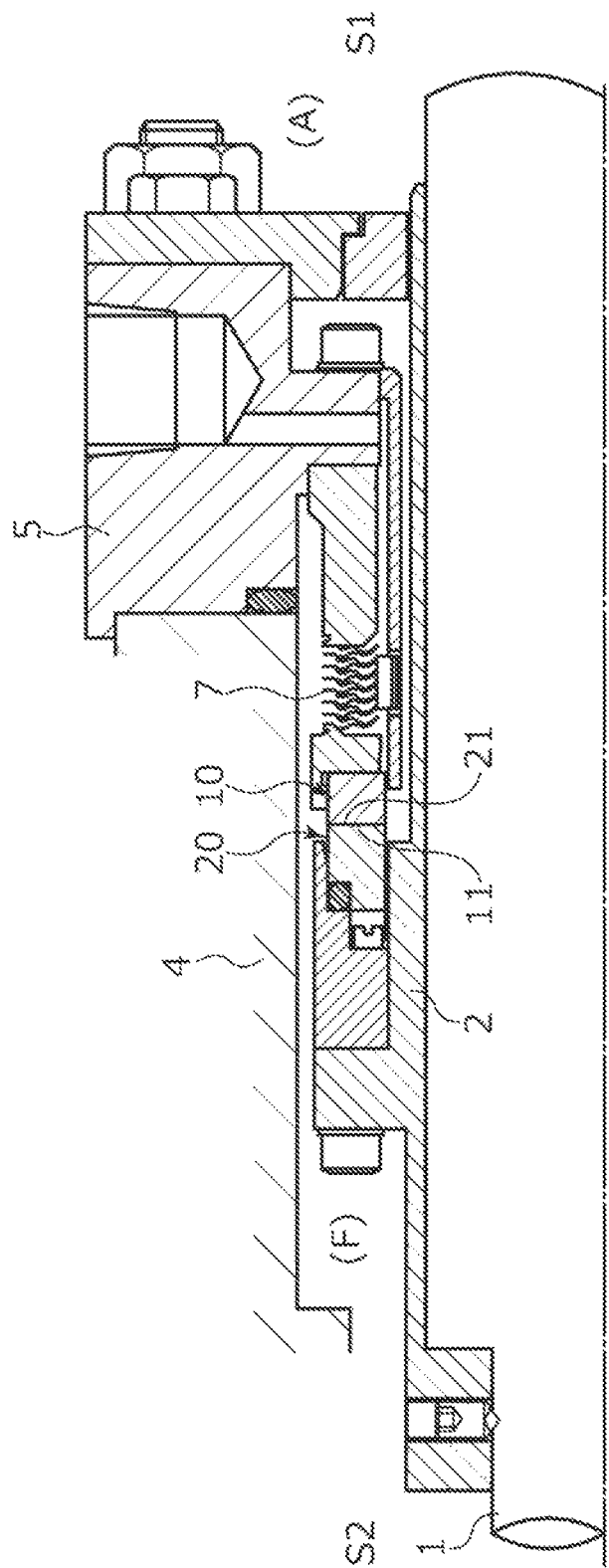
FIG. 1 is a longitudinal sectional view showing an example of a mechanical seal according to a first embodiment of the present invention.

Modes for carrying out a sliding component according to the present invention will be described below on the basis of the embodiments.

First Embodiment

A sliding component according to a first embodiment of the present invention will be described with reference to FIGS. 1 to 7. Additionally, in this embodiment, an embodiment in which a sliding component is a mechanical seal will be described as an example. Further, a description will be made such that a sealing target fluid exists in an outer space of the mechanical seal, an atmosphere exists in an inner space, an outer radial side of the sliding component constituting the mechanical seal is a sealing target fluid side (high pressure side), and an inner radial side is a leakage side (low pressure side). Further, for convenience of description, in the drawings, dots may be added to a groove and the like formed on a sliding surface.

A mechanical seal for general industrial machines shown in FIG. 1 is of an inside type that seals a sealing target fluid F tending to leak from the outer radial side toward the inner radial side of the sliding surface and allows an inner space S1 to communicate with an atmosphere A. Additionally, in this embodiment, an embodiment in which the sealing target fluid F is a high-pressure liquid and the atmosphere A is a gas having a pressure lower than that of the sealing target fluid F is illustrated.

The mechanical seal mainly includes a rotating seal ring 20 which is the other annular sliding component provided in a rotary shaft 1 through a sleeve 2 to be rotatable together with the rotary shaft 1 and an annular stationary seal ring 10 which is a sliding component provided in a seal cover 5 fixed to a housing 4 of an attachment target device not to be rotatable and to be movable in the axial direction and when the bellows 7 urges the stationary seal ring 10 in the axial direction, a sliding surface 11 of the stationary seal ring 10 and a sliding surface 21 of the rotating seal ring 20 slide closely with each other. Additionally, the sliding surface 21 of the rotating seal ring 20 is formed as a flat surface and this flat surface is not provided with a concave portion such as a groove.

The stationary seal ring 10 and the rotating seal ring 20 are typically formed of SiC (as an example of hard material) or a combination of SiC and carbon (as an example of soft material). However, the present invention is not limited thereto and any sliding material can be applied insofar as it is used as a sliding material for a mechanical seal. It should be noted that the SiC includes a sintered body using boron, aluminum, carbon, or the like as a sintering aid and a material made of two or more types of phases having different components and compositions, examples of which include SiC in which graphite particles are dispersed, reaction-sintered SiC made of SiC and Si, SiC—TiC, and SiC—TiN. As the carbon, resin-molded carbon, sintered carbon, and the like can be used, including carbon in which carbon and graphite are mixed. In addition to the above sliding materials, a metal material, a resin material, a surface modification material (e.g., coating material), a composite material, and the like can also be applied.

Figure 2:
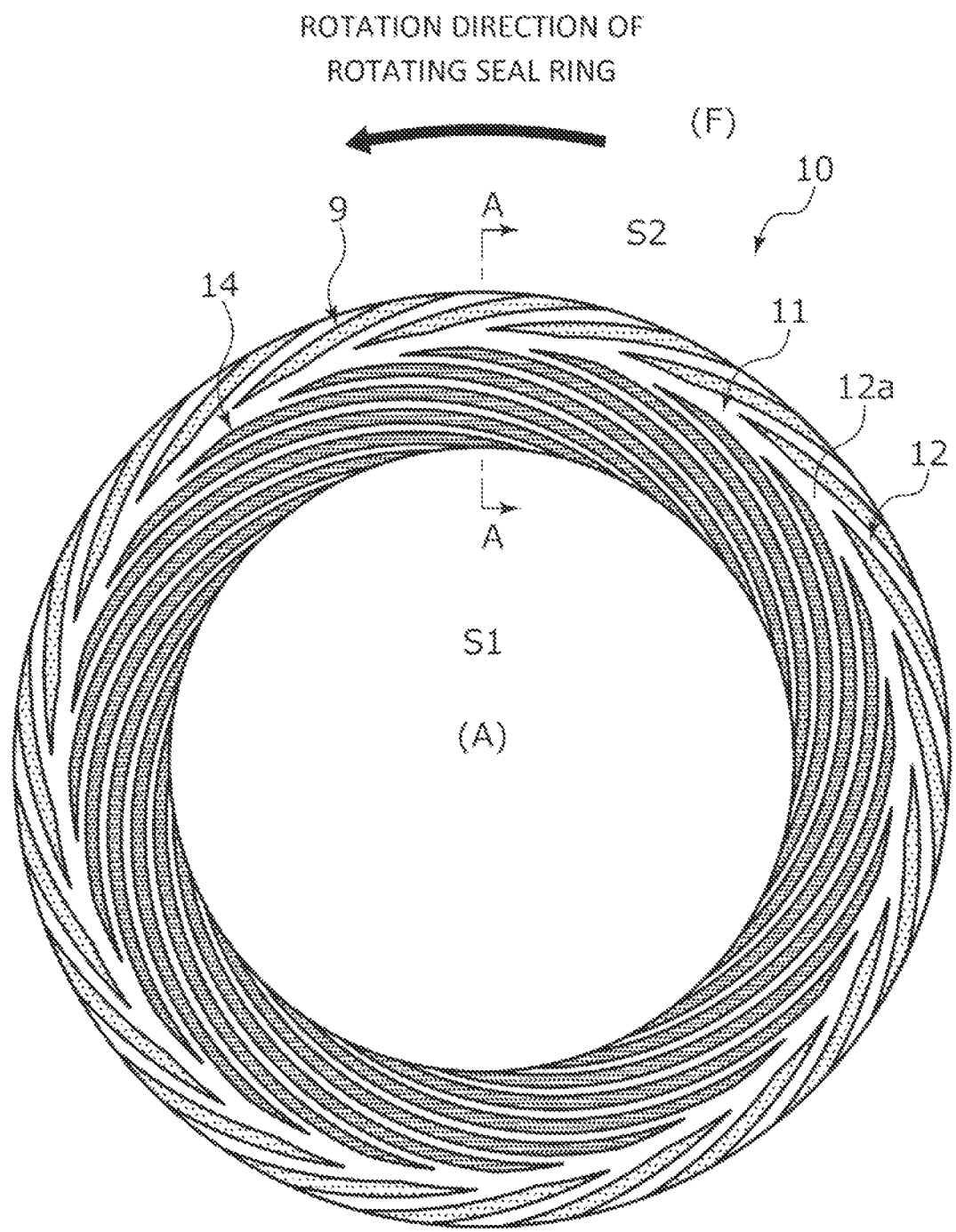
FIG. 2 is a view showing a sliding surface of a stationary seal ring from the axial direction in the first embodiment.
Figure 3:
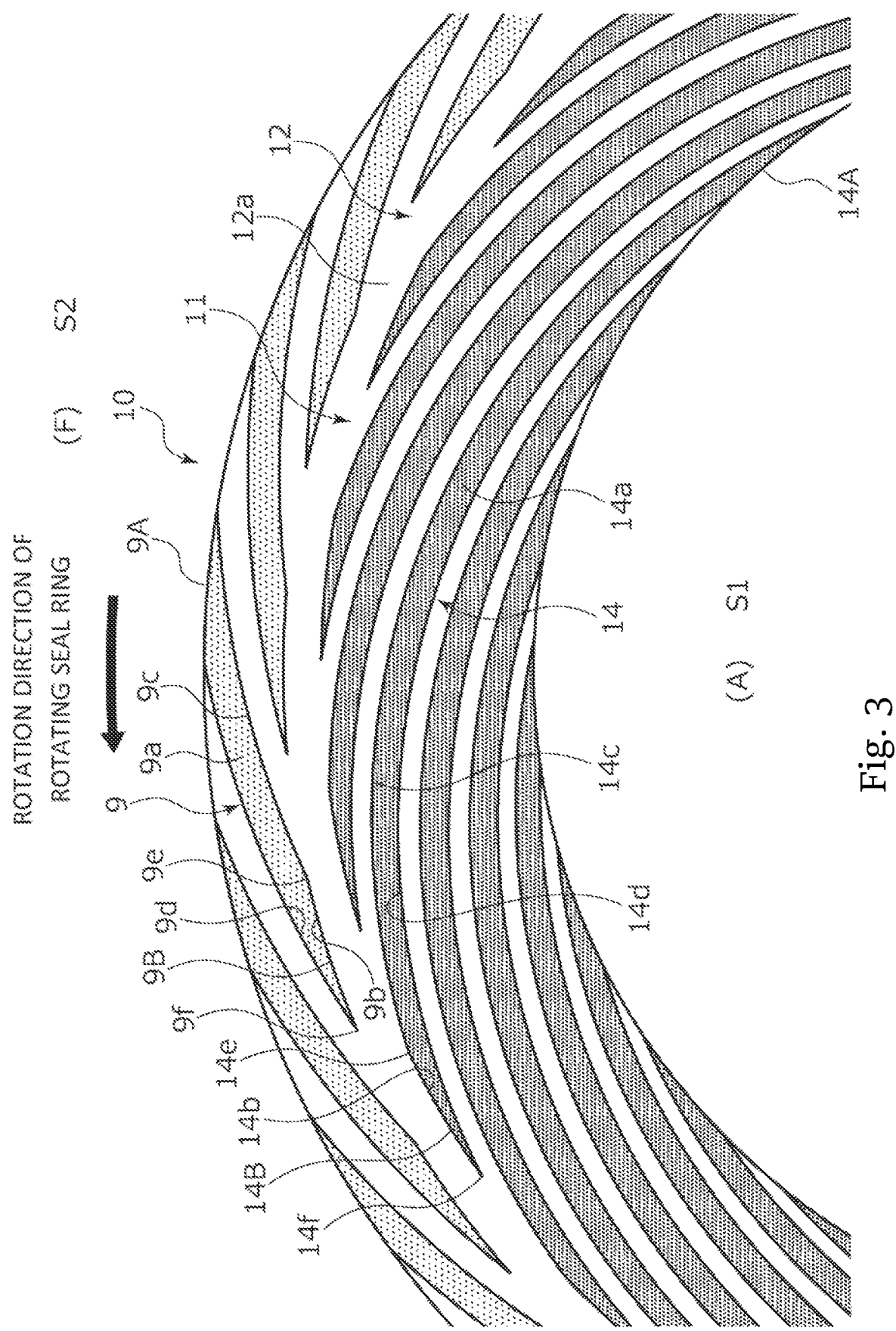
FIG. 3 is an enlarged view showing the sliding surface of the stationary seal ring from the axial direction in the first embodiment.

As shown in FIGS. 2 and 3, the rotating seal ring 20 slides relative to the stationary seal ring 10 counterclockwise as indicated by the arrow and in the sliding surface 11 of the stationary seal ring 10, a plurality of (in the first embodiment, twenty) first dynamic pressure generation grooves 14 are evenly provided in the circumferential direction on the inner radial side and a plurality of (in the first embodiment, twenty) second dynamic pressure generation grooves 9 are evenly provided in the circumferential direction on the outer radial side.

Further, a portion other than the first dynamic pressure generation groove 14 and the second dynamic pressure generation groove 9 of the sliding surface 11 is formed as a land 12 which is a flat surface. Specifically, the land 12 includes a portion which is formed between the first dynamic pressure generation grooves 14 adjacent to each other in the circumferential direction, a portion which is formed between the second dynamic pressure generation grooves 9 adjacent to each other in the circumferential direction, and an annular land portion 12a which is formed between the first dynamic pressure generation groove 14 and the second dynamic pressure generation groove 9 separated from each other in the radial direction and these portions are arranged on the same plane as the surface (hereinafter, referred to as a flat surface of the land 12) of the land 12 on the side of the sliding surface 11. Additionally, the annular land portion 12a will be described later.

In the first dynamic pressure generation groove 14, an inner radial end portion, that is, a relative rotation starting end 14A communicates with the inner space S1 and extends in an arc shape from the starting end 14A toward the outer radial side while being inclined toward the rotation terminating end of the rotating seal ring 20 and an outer radial end portion, that is, a relative rotation terminating end 14B is closed by a wall portion 14b not to communicate with an outer space S2. The first dynamic pressure generation groove 14 is formed in an arc shape protruding toward the outer radial side.

Specifically, the first dynamic pressure generation groove 14 includes a bottom surface 14a which is flat from the starting end 14A to the terminating end 14B and is parallel to the flat surface of the land 12, a wall portion 14b which extends vertically toward the sliding surface 11 from the end edge of the terminating end 14B of the bottom surface 14a, and side wall portions 14c and 14d which extend vertically toward the sliding surface 11 from both side edges of the bottom surface 14a. Additionally, an angle formed by the wall portion 14b and the side wall portion 14c is an obtuse angle, an angle formed by the wall portion 14b and the side wall portion 14d is an acute angle, and an acute angle portion 14f on the side of the side wall portion 14d of the wall portion 14b is located on the rotation terminating end side of the rotating seal ring 20 in relation to an obtuse angle portion 14e on the side of the side wall portion 14c of the wall portion 14b.

The first dynamic pressure generation grooves 14 are arranged so that the plurality of (in the first embodiment, six) first dynamic pressure generation grooves 14 are arranged to overlap each other in the radial direction when viewed from the axial direction.

Further, in the second dynamic pressure generation groove 9, an outer radial end portion, that is, a relative rotation starting end 9A communicates with the outer space S2 and extends in an arc shape from the starting end 9A toward the inner radial side while being inclined toward the rotation terminating end of the rotating seal ring 20 and an inner radial end portion, that is, a relative rotation terminating end 9B is closed by a wall portion 9b not to communicate with the inner space S1. The second dynamic pressure generation groove 9 is formed in an arc shape protruding toward the outer radial side.

Specifically, the second dynamic pressure generation groove 9 includes a bottom surface 9a which is flat from the starting end 9A to the terminating end 9B and is parallel to the flat surface of the land 12, the wall portion 9b which extends vertically toward the sliding surface 11 from the end edge of the terminating end 9B of the bottom surface 9a, and side wall portions 9c and 9d which extend vertically toward the sliding surface 11 from both side edges of the bottom surface 9a. Additionally, an angle formed by the wall portion 9b and the side wall portion 9c is an obtuse angle, an angle formed by the wall portion 9b and the side wall portion 9d is an acute angle, and an acute angle portion 9f on the side of the side wall portion 9d of the wall portion 9b is located on the rotation terminating end side of the rotating seal ring 20 in relation to an obtuse angle portion 9e on the side of the side wall portion 9c of the wall portion 9b.

The second dynamic pressure generation grooves 9 are arranged so that the second dynamic pressure generation grooves 9 which are adjacent to each other in the axial direction overlap each other in the radial direction.

Further, the terminating end 9B of the second dynamic pressure generation groove 9 is disposed to be separated toward the outer radial side in relation to the terminating end 14B of the first dynamic pressure generation groove 14. That is, the annular land portion 12a which is a land portion having a constant radial width is continuously formed in the circumferential direction between the terminating end 14B of the first dynamic pressure generation groove 14 and the terminating end 9B of the second dynamic pressure generation groove 9.

Further, the length of the second dynamic pressure generation groove 9 from the starting end 9A to the terminating end 9B, that is, the extension length of the second dynamic pressure generation groove 9 is shorter than the length of the first dynamic pressure generation groove 14 from the starting end 9A to the terminating end 9B, that is, the extension length of the first dynamic pressure generation groove 14.

Further, the second dynamic pressure generation groove 9 is inclined along the circumferential direction compared to the first dynamic pressure generation groove 14. The radial center of the annular land portion 12a is provided on the outer radial side in relation to the radial center of the sliding surface 11.

Figure 4:
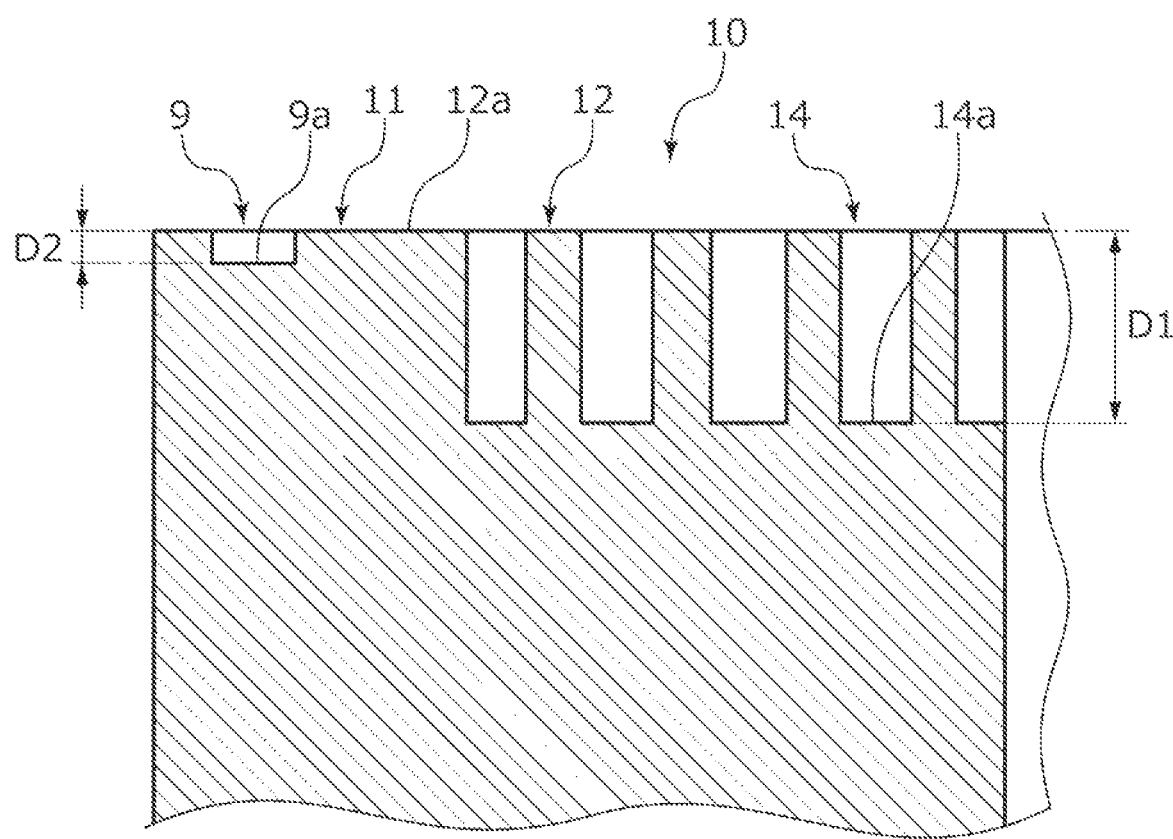
FIG. 4 is a cross-sectional view taken along the line A-A of FIG. 2.
Figure 5:
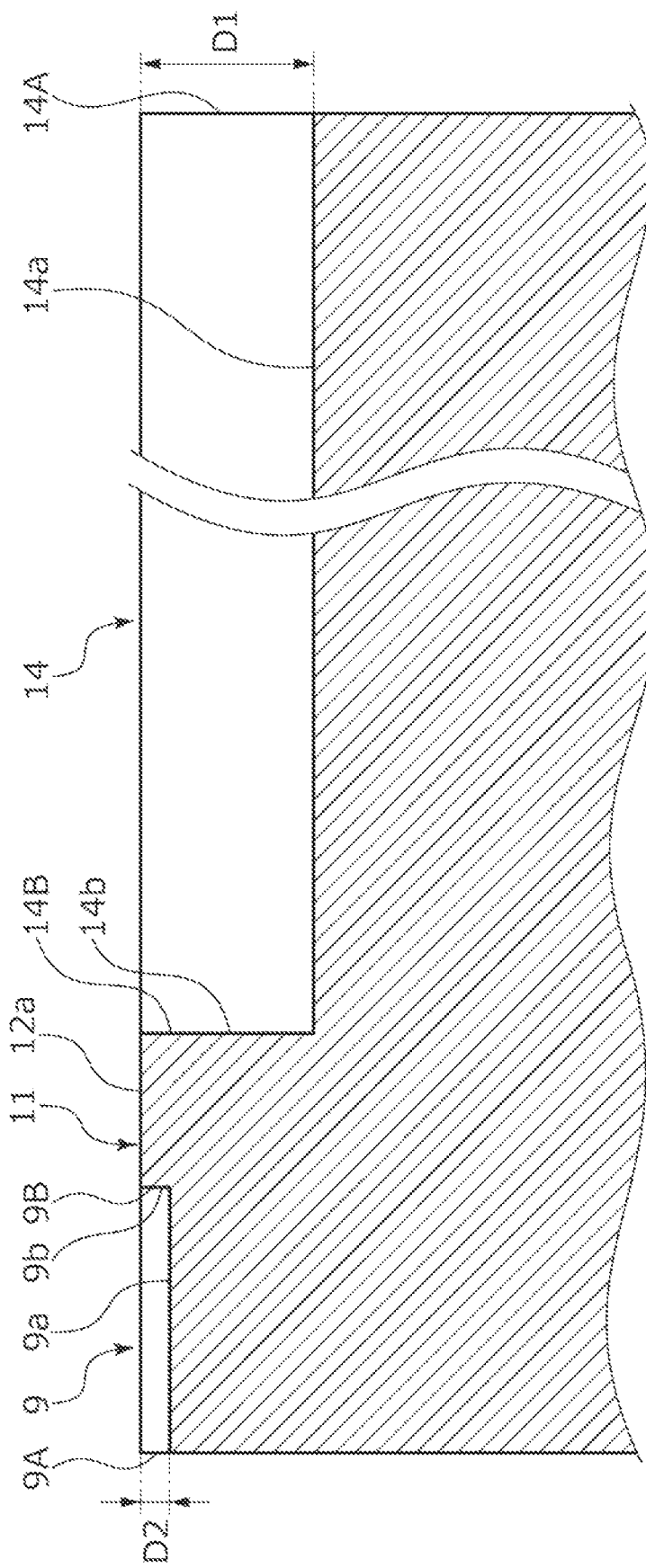
FIG. 5 is a cross-sectional view schematically showing a first dynamic pressure generation groove and a second dynamic pressure generation groove in the first embodiment.

As shown in FIGS. 4 and 5, the first dynamic pressure generation groove 14 has a constant depth D1 from the starting end 14A to the terminating end 14B. The depth D1 of this embodiment is 10 µm.

The second dynamic pressure generation groove 9 has a constant depth D2 from the starting end 9A to the terminating end 9B. The depth D2 of this embodiment is 0.5 µm.

The depth D2 of the second dynamic pressure generation groove 9 is shallower than the depth D1 of the first dynamic pressure generation groove 14 (D2<D1) and the depth D2 is preferably ½ to ¹⁄₂₀ times the depth D1.

In addition, FIG. 5 is a schematic cross-sectional view assuming a state in which each of one set of the first dynamic pressure generation grooves 14 and one set of the second dynamic pressure generation grooves 9 is cut in the longitudinal direction.

Next, an operation during the relative rotation between the stationary seal ring 10 and the rotating seal ring 20 will be described with reference to FIGS. 6 and 7. First, the sealing target fluid F flows into the second dynamic pressure generation groove 9 during the non-operation of the general industrial machine in which the rotating seal ring 20 is not rotating. Additionally, since the bellows 7 urges the stationary seal ring 10 toward the rotating seal ring 20, the sliding surfaces 11 and 21 are in the contact state and there is almost no leakage amount of the sealing target fluid F between the sliding surfaces 11 and 21 to the inner space S1.

Figure 6:
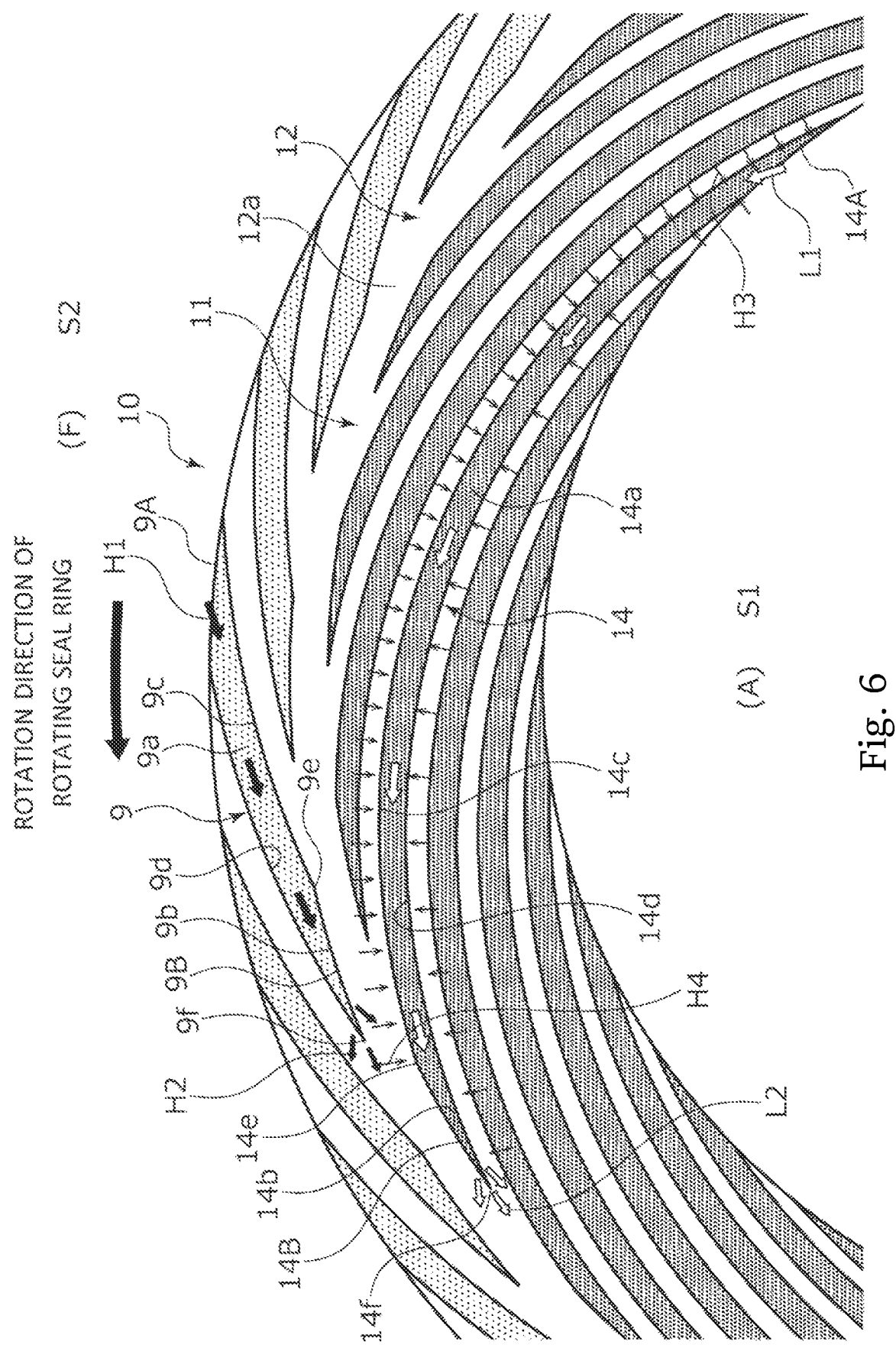
FIG. 6 is an explanatory diagram showing the movement of a fluid in the first dynamic pressure generation groove and the second dynamic pressure generation groove from the axial direction in the first embodiment.
Figure 7:
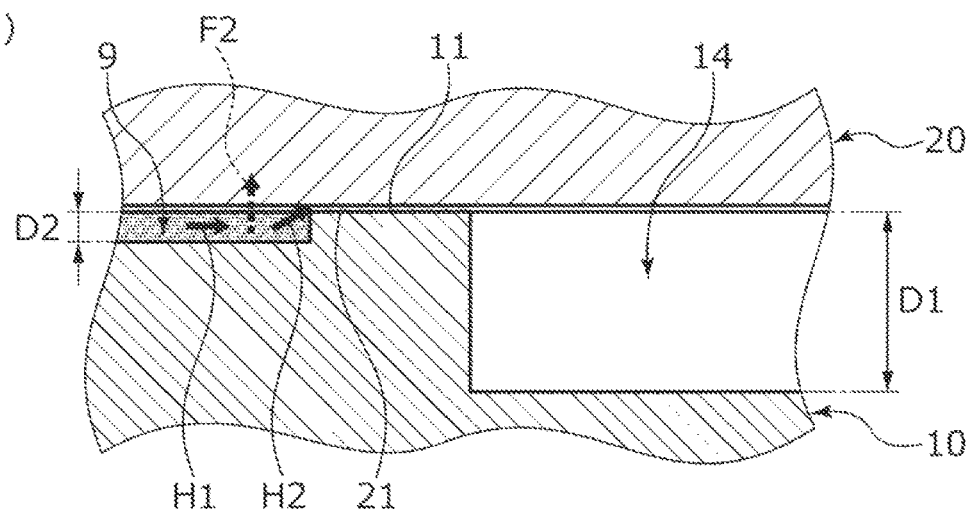
FIGS. 7A to 7C are cross-sectional views schematically showing a separation between sliding surfaces at each relative rotation speed of a pair of sliding components.
Figure 7:
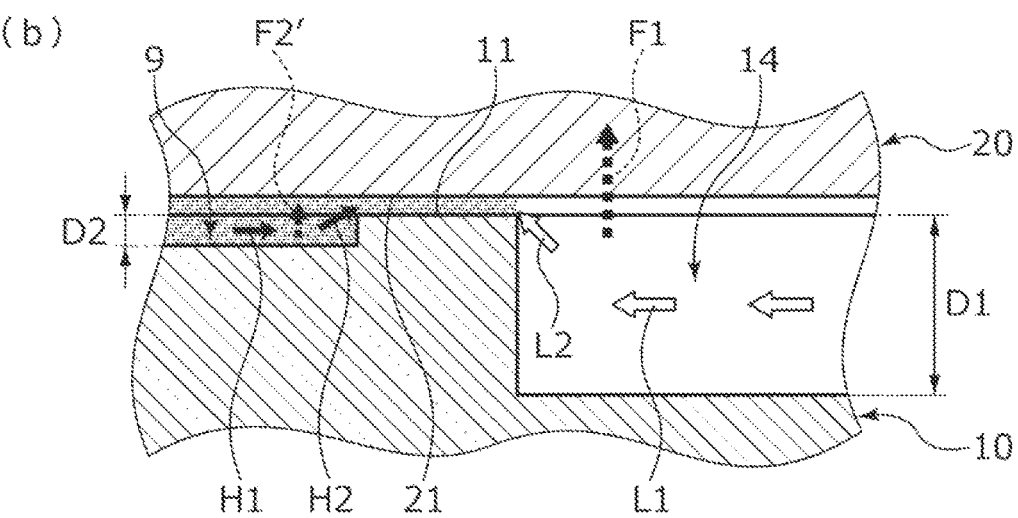
Figure 7:
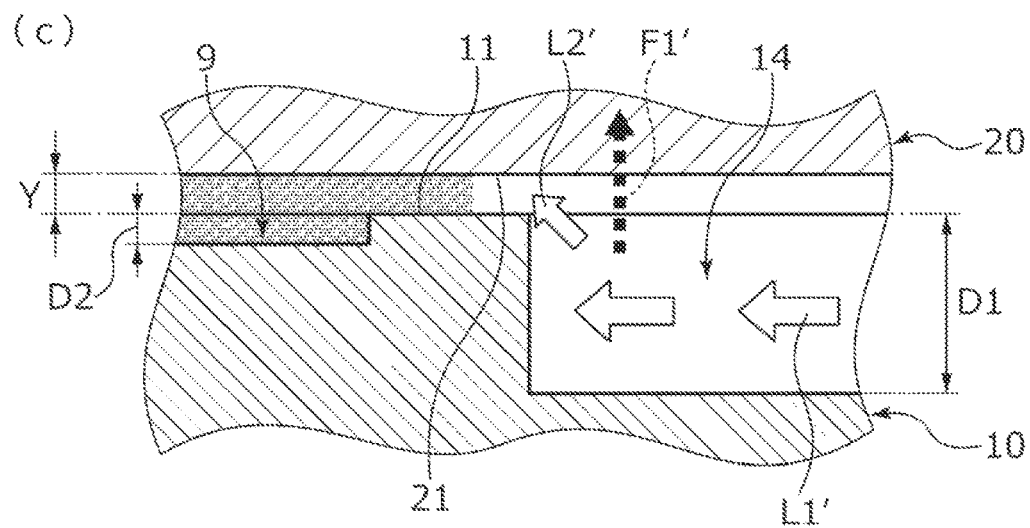

At a low speed immediately after the rotating seal ring 20 starts to rotate relative to the stationary seal ring 10, as shown in FIGS. 6 and 7A, the sealing target fluid F in the second dynamic pressure generation groove 9 moves along the rotation direction of the rotating seal ring 20 due to the friction with the sliding surface 21 and the sealing target fluid F of the outer space S2 is sucked to the second dynamic pressure generation groove 9. That is, in the second dynamic pressure generation groove 9, the sealing target fluid F moves from the starting end 9A toward the terminating end 9B as indicated by the arrow H1. Additionally, the flow of the sealing target fluid F or the atmosphere A of FIG. 6 is schematically shown without specifying the relative rotation speed of the rotating seal ring 20.

The sealing target fluid F moving toward the terminating end 9B can increase the pressure in the acute angle portion 9f of the wall portion 9b of the second dynamic pressure generation groove 9 and the vicinity thereof. That is, a positive pressure is generated in the acute angle portion 9f and the vicinity thereof.

Since the depth D2 of the second dynamic pressure generation groove 9 is shallow, a positive pressure is generated in the acute angle portion 9f of the wall portion 9b of the second dynamic pressure generation groove 9 and the vicinity thereof even when the movement amount of the sealing target fluid F is small at the low rotation speed of the rotating seal ring 20.

The sliding surfaces 11 and 21 are slightly separated from each other by a second force F2 due to the positive pressure generated in the acute angle portion 9f and the vicinity thereof. Accordingly, the sealing target fluid F in the second dynamic pressure generation groove 9 mainly indicated by the arrow H2 flows between the sliding surfaces 11 and 21. In this way, since the sealing target fluid F is interposed between the sliding surfaces 11 and 21, lubricity is improved even at the low-speed rotation and the wear between the sliding surfaces 11 and 21 can be suppressed. Additionally, since the levitation distance between the sliding surfaces 11 and 21 is small, the amount of the sealing target fluid F leaking into the inner space S1 is small.

On the other hand, since the depth D1 of the first dynamic pressure generation groove 14 is deeper than the depth D2 of the second dynamic pressure generation groove 9, the atmosphere A is not sufficiently sealed in the second dynamic pressure generation groove 9 during the low-speed relative rotation of the rotating seal ring 20 and the stationary seal ring 10 and hence a high positive pressure is not generated. As a result, a first force F1 (not shown in FIG. 7A) caused by the positive pressure generated in the first dynamic pressure generation groove 14 is smaller than a second force F2. Thus, the second force F2 mainly acts to separate the sliding surfaces 11 and 21 from each other during the low-speed rotation of the rotating seal ring 20.

When the relative rotation speed of the rotating seal ring 20 becomes higher, as shown in FIGS. 6 and 7B, the atmosphere A in the first dynamic pressure generation groove 14 moves along the rotation direction of the rotating seal ring 20 due to the friction with the sliding surface 21 and the atmosphere A of the inner space S1 is sucked into the first dynamic pressure generation groove 14. That is, in the first dynamic pressure generation groove 14, a large amount of the atmosphere A moves from the starting end 14A toward the terminating end 14B as indicated by the arrow L1.

The atmosphere A moving toward the terminating end 14B can increase the pressure in the acute angle portion 14f of the wall portion 14b of the first dynamic pressure generation groove 14 and the vicinity thereof. That is, a positive pressure is generated in the acute angle portion 14f and the vicinity thereof.

Since the first force F1 caused by the positive pressure generated in the acute angle portion 14f and the vicinity thereof is added, the sliding surfaces 11 and 21 are further separated from each other compared to FIG. 7A. Accordingly, the atmosphere A in the first dynamic pressure generation groove 14 mainly indicated by the arrow L2 flows between the sliding surfaces 11 and 21.

Since the atmosphere A in the first dynamic pressure generation groove 14 indicated by the arrow L2 acts to push back the sealing target fluid F in the vicinity of the terminating end 14B of the first dynamic pressure generation groove 14 toward the outer space S2, the amount of the sealing target fluid F leaking into the first dynamic pressure generation groove 14 or the inner space S1 is small.

Further, since the sliding surfaces 11 and 21 are further separated from each other compared to FIG. 7A, the sealing target fluid F in the second dynamic pressure generation groove 9 is likely to escape between the sliding surfaces 11 and 21 and hence a second force F2' becomes smaller than that of FIG. 7A.

Further, at this time, the sealing target fluid F in the periphery of the portion other than the acute angle portion 14*f* of the first dynamic pressure generation groove 14 is sucked into the first dynamic pressure generation groove 14 by the negative pressure generated in the first dynamic pressure generation groove 14 as indicated by the arrow H3 and this tendency becomes remarkable in the vicinity of the starting end 14A. The sealing target fluid F sucked into the first dynamic pressure generation groove 14 is returned from the terminating end 14B of the first dynamic pressure generation groove 14 to the gap between the sliding surfaces 11 and 21.

On the other hand, since the sealing target fluid F in the vicinity of the acute angle portion 14*f* of the first dynamic pressure generation groove 14 has a high pressure as described above, the sealing target fluid does not almost enter the first dynamic pressure generation groove 14 while being located at the land 12 as indicated by the arrow H4.

As described above, since the first dynamic pressure generation grooves 14 are arranged so that the plurality of first dynamic pressure generation grooves 14 overlap each other in the radial direction, the sealing target fluid F moving to the land 12 from the acute angle portion 14*f* of the first dynamic pressure generation groove 14 adjacent to a certain first dynamic pressure generation groove 14 at the rotation starting end side of the rotating seal ring 20 is sucked by the negative pressure generated in the first dynamic pressure generation groove 14. Accordingly, it is possible to prevent the sealing target fluid F from leaking to the inner space S1.

When the relative rotation speed of the rotating seal ring 20 further increases and reaches a high-speed rotation (that is, a steady operation state), as shown in FIGS. 6 and 7C, the inflow amount (see the arrow L1' of FIG. 7C) of the atmosphere A sucked into the first dynamic pressure generation groove 14 further increases so that a high positive pressure is generated and the first force F1' increases. As a result, the sliding surfaces 11 and 21 are separated from each other by a long levitation distance Y compared to FIG. 7B. Accordingly, a larger amount of the atmosphere A in the first dynamic pressure generation groove 14 indicated by the arrow L2' flows between the sliding surfaces 11 and 21 compared to FIG. 7B.

Since the atmosphere A in the first dynamic pressure generation groove 14 indicated by the arrow L2' acts to push back the sealing target fluid F in the vicinity of the terminating end 14B of the first dynamic pressure generation groove 14 toward the outer space S2, the amount of the sealing target fluid F leaking into the first dynamic pressure generation groove 14 or the inner space S1 is small.

In this embodiment, when the levitation distance Y increases due to the high-speed rotation of the rotating seal ring 20, the sealing target fluid F in the second dynamic pressure generation groove 9 is likely to escape between the sliding surfaces 11 and 21 and the positive pressure generated in the second dynamic pressure generation groove 9 becomes negligibly small. Thus, the first force F1 mainly acts to separate the sliding surfaces 11 and 21 from each other at the high-speed rotation of the rotating seal ring 20.

As described above, since the depth D2 of the second dynamic pressure generation groove 9 is shallower than the depth D1 of the first dynamic pressure generation groove 14, the second force F2 caused by the positive pressure generated by the sealing target fluid F in the second dynamic pressure generation groove 9 mainly acts to separate the sliding surfaces 11 and 21 from each other during the low-speed relative rotation of the rotating seal ring 20. As the relative rotation speed of the rotating seal ring 20 increases, the first force F1 caused by the positive pressure generated by the atmosphere A in the first dynamic pressure generation groove 14 suddenly increases. Then, when the relative rotation speed of the rotating seal ring 20 becomes sufficiently high, the first force F1 becomes larger than the second force F2 and the first force F1 mainly acts to separate the sliding surfaces 11 and 21 from each other. Accordingly, it is possible to suppress the wear between the sliding surfaces 11 and 21 from the low speed to the high speed of the relative rotation of the stationary seal ring 10 and the rotating seal ring 20.

Further, since a gap formed between the sliding surfaces 11 and 21 increases during the high-speed relative rotation of the rotating seal ring 20, the positive pressure is not easily generated in the second dynamic pressure generation groove 9. Accordingly, the first force F1 caused by the positive pressure generated in the first dynamic pressure generation groove 14 mainly acts to stably separate the sliding surfaces 11 and 21 from each other. Thus, it is possible to suppress the wear by separating the sliding surfaces 11 and 21 from each other from the start of the relative rotation of the stationary seal ring 10 and the rotating seal ring 20 to the high-speed rotation.

Further, since the second dynamic pressure generation groove 9 communicates with the outer space S2, it is possible to easily introduce the sealing target fluid F into the second dynamic pressure generation groove 9 and to generate a positive pressure at an early time.

Further, since the annular land portion 12*a* having a constant radial width is continuously provided in the circumferential direction between the terminating end 14B of the first dynamic pressure generation groove 14 and the terminating end 9B of the second dynamic pressure generation groove 9, it is possible to suppress the sealing target fluid F between the sliding surfaces 11 and 21 from flowing to the inner space S1 by the annular land portion 12*a* when the second force F2 caused by the positive pressure generated in the second dynamic pressure generation groove 9 separates the sliding surfaces 11 and 21 from each other. Further, it is possible to suppress the leakage of the sealing target fluid F to the inner space S1 in a stationary state in which the stationary seal ring 10 and the rotating seal ring 20 do not rotate relative to each other.

Further, since the radial center of the annular land portion 12*a* is disposed to be closer to the sealing target fluid than the radial center of the sliding surface 11, it is possible to ensure the long extension length of the first dynamic pressure generation groove 14 and to arrange a large number of the first dynamic pressure generation grooves 14 side by side. Accordingly, since the first dynamic pressure generation groove 14 serves as a main dynamic pressure generation source compared to the second dynamic pressure generation groove 9, it is possible to suppress the leakage of the sealing target fluid F to the inner space S1. Additionally, the radial center of the annular land portion 12*a* is the radial position obtained by adding the outer diameter and the inner diameter of the annular land portion 12*a* and dividing the result by 2 and the radial center of the sliding surface 11 is the radial position obtained by adding the outer diameter and the inner diameter of the sliding surface 11 and dividing the result by 2.

Further, since the depth of the second dynamic pressure generation groove 9 is set to a dimension that reliably reduces the influence of the positive pressure generated in the second dynamic pressure generation groove 9 during the high-speed rotation of the rotating seal ring 20, it is possible to reliably separate the sliding surfaces 11 and 21 by the first force F1 caused by the positive pressure generated in the first dynamic pressure generation groove 14.

Further, since the terminating end 9B of the second dynamic pressure generation groove 9 is provided with the wall portion 9b which extends from the bottom surface 9a toward the sliding surface 11, the sealing target fluid F concentrates on the acute angle portion 9f of the wall portion 9b of the terminating end 9B of the second dynamic pressure generation groove 9 during the relative rotation of the stationary seal ring 10 and the rotating seal ring 20 and hence the positive pressure can be reliably generated in the vicinity of the terminating end 9B.

Further, since the extension length of the second dynamic pressure generation groove 9 is shorter than that of the first dynamic pressure generation groove 14, it is possible to generate a high positive pressure by the first dynamic pressure generation groove 14 during the high-speed relative rotation of the stationary seal ring 10 and the rotating seal ring 20 and to generate a positive pressure by the second dynamic pressure generation groove 9 at an early time during the low-speed relative rotation.

Further, since the second dynamic pressure generation groove 9 extends from the starting end 9A toward the inner radial side while being inclined toward the rotation terminating end of the rotating seal ring 20, it is possible to easily introduce the sealing target fluid F into the second dynamic pressure generation groove 9 and to generate a positive pressure at an early time during the relative rotation of the stationary seal ring 10 and the rotating seal ring 20.

Further, since the first dynamic pressure generation groove 14 extends from the starting end 14A toward the outer radial side while being inclined toward the rotation terminating end of the rotating seal ring 20 and the second dynamic pressure generation groove 9 is inclined along the circumferential direction compared to the first dynamic pressure generation groove 14, it is possible to easily introduce the sealing target fluid F into the second dynamic pressure generation groove 9 when the relative rotation of the stationary seal ring 10 and the rotating seal ring 20 starts and to generate a positive pressure by the second dynamic pressure generation groove 9 at an early time.

Further, since the second dynamic pressure generation groove 9 is disposed on the outer radial side of the sliding surface 11, the second dynamic pressure generation groove 9 is disposed at a position in which the circumferential speed of the relative rotation of the rotating seal ring 20 is fast and hence the sealing target fluid F can be easily introduced into the second dynamic pressure generation groove 9 when the relative rotation of the stationary seal ring 10 and the rotating seal ring 20 starts.

Further, since the terminating end 14B of the first dynamic pressure generation groove 14 and the terminating end 9B of the second dynamic pressure generation groove 9 are arranged not to overlap each other in the radial direction and the terminating end 14B and the terminating end 9B are separated from each other, a positive pressure is generated in the vicinity of the terminating end 9B of the second dynamic pressure generation groove 9, the sealing target fluid F moving between the sliding surfaces 11 and 21 does not easily flow into the second dynamic pressure generation groove 9, and hence the sealing target fluid F does not easily leak to the inner space S1. Further, since the first force F1 of the first dynamic pressure generation groove 14 and the second force F2 of the second dynamic pressure generation groove 9 are generated at a non-overlapping position in the radial direction, a well-balanced force can be applied between the sliding surfaces 11 and 21 to separate them.

In addition, the depth D1 and the depth D2 are not limited to those of the first embodiment and may be freely changed if the depth D2 is shallower than the depth D1.

Second Embodiment

Next, a mechanical seal according to a second embodiment of the present invention will be described with reference to FIG. 8. In addition, the description of the configuration that is the same as that of the above-described embodiment and is duplicated will be omitted. Further, in FIG. 8, the length from the starting end to the terminating end of the first dynamic pressure generation groove is depicted to be shorter than the actual length.

Figure 8:
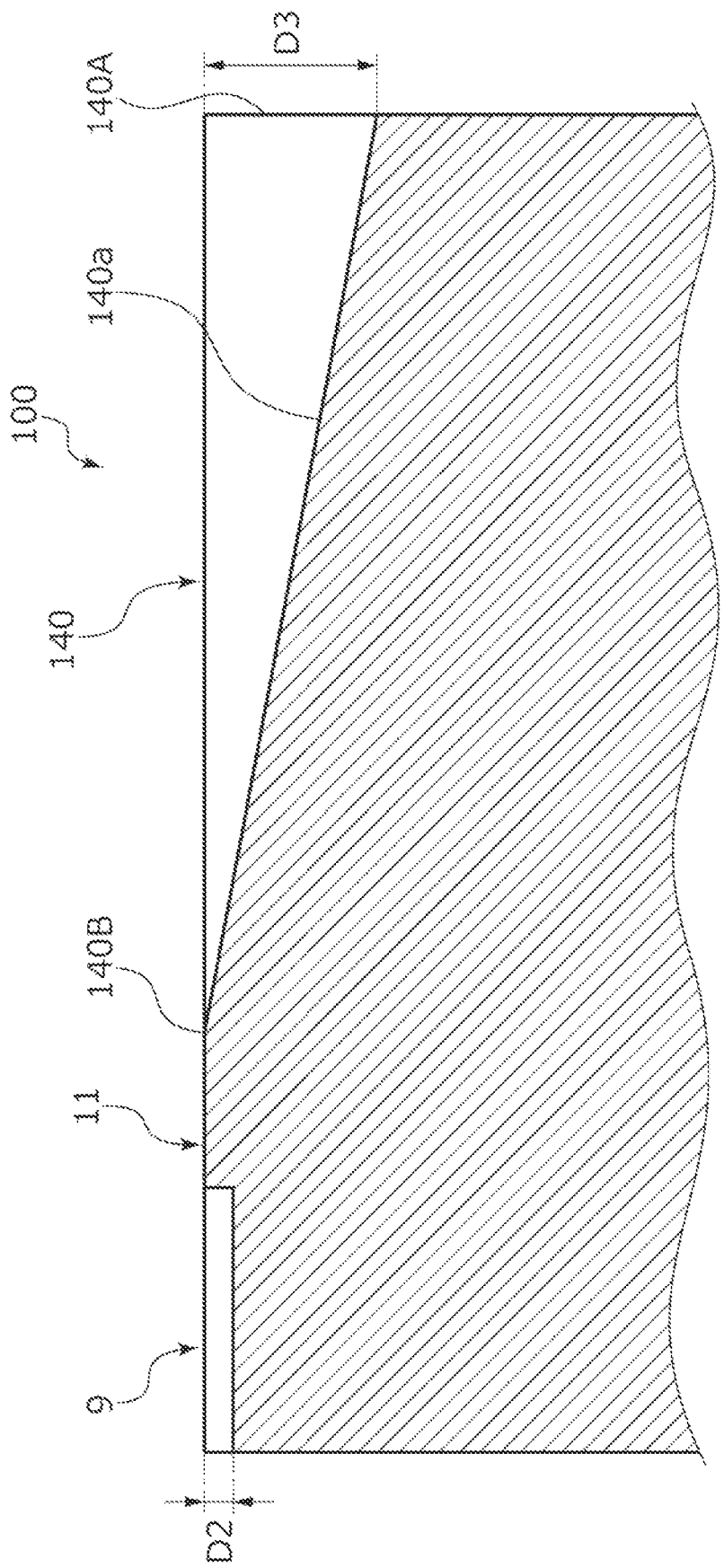
FIG. 8 is an explanatory diagram schematically showing an example of a mechanical seal according to a second embodiment of the present invention.

As shown in FIG. 8, a bottom surface 140a of a first dynamic pressure generation groove 140 of a stationary seal ring 100 of this second embodiment is inclined so that the axial dimension becomes smaller from the starting end 140A toward the terminating end 140B.

The depth D2 of the second dynamic pressure generation groove 9 is deeper than the depth in the vicinity of the terminating end 140B of the first dynamic pressure generation groove 140, but is shallower than the depth D3 of the deepest position (deepest portion) of the first dynamic pressure generation groove 140 (D2<D3).

In this way, since the depth D2 of the second dynamic pressure generation groove 9 is shallower than the depth D3 of the deepest portion of the first dynamic pressure generation groove 140, the second force caused by the positive pressure generated by the sealing target fluid F in the second dynamic pressure generation groove 9 mainly acts to separate the sliding surfaces 11 and 21 from each other during the low-speed relative rotation of the rotating seal ring 20. Further, the positive pressure is easily generated in the vicinity of the terminating end 140B of the first dynamic pressure generation groove 140.

Third Embodiment

Next, a mechanical seal according to a third embodiment of the present invention will be described with reference to FIG. 9. In addition, the description of the configuration overlapping with the same configuration as that of the above-described embodiment will be omitted. Further, in FIG. 9, the length from the starting end to the terminating end of the first dynamic pressure generation groove is depicted to be shorter than the actual length.

Figure 9:
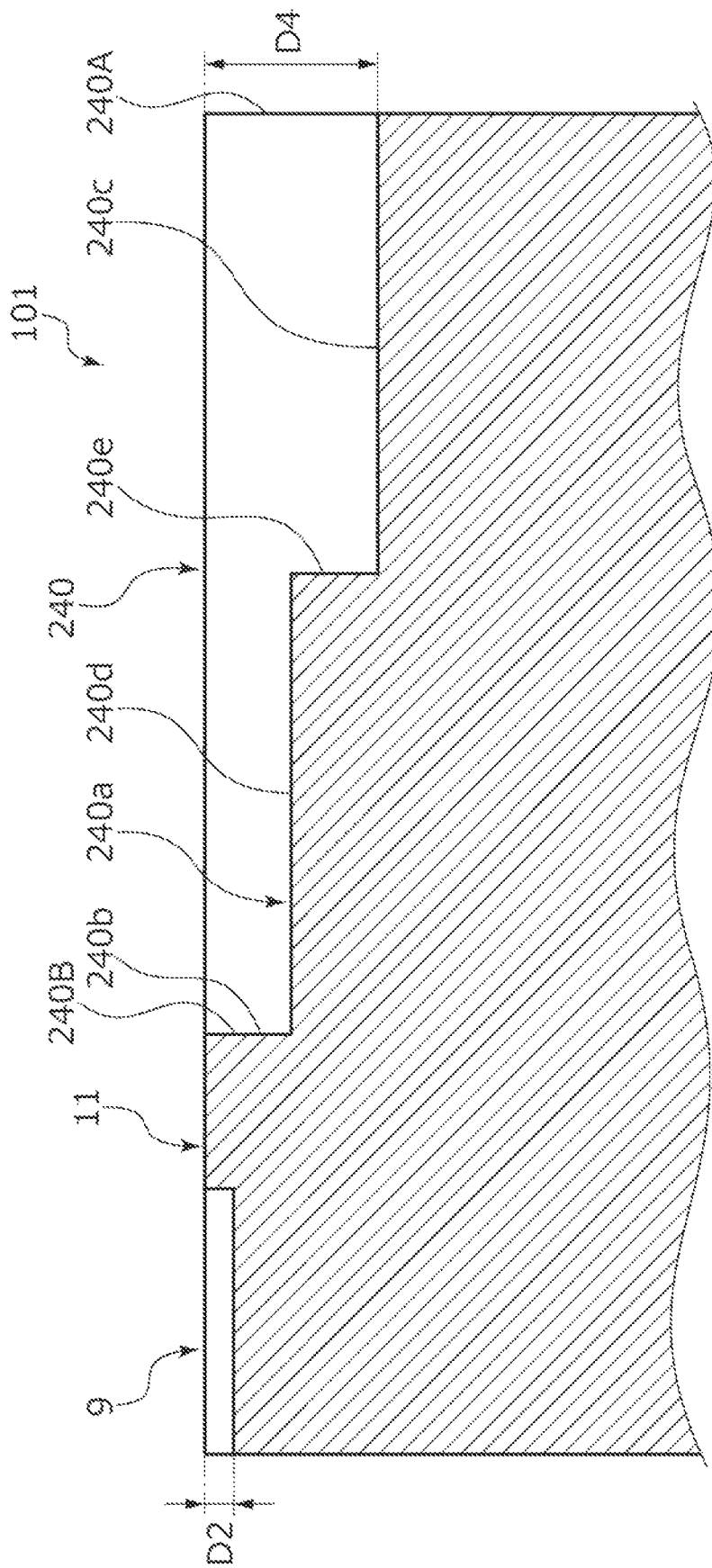
FIG. 9 is an explanatory diagram schematically showing an example of a mechanical seal according to a third embodiment of the present invention.

As shown in FIG. 9, a bottom surface 240a of a first dynamic pressure generation groove 240 of a stationary seal ring 101 of this third embodiment is formed in a step shape from a starting end 240A to a terminating end 240B.

Specifically, a deep bottom surface 240c having a large axial dimension is provided on the side of the starting end 240A of the bottom surface 240a and a shallow bottom surface 240d having a small axial dimension is provided on the side of the terminating end 240B of the bottom surface 240a with the longitudinal center of the first dynamic pressure generation groove 240 as a boundary. Further, an intermediate wall portion 240e is provided to extend vertically from the end edge of the deep bottom surface 240c toward the shallow bottom surface 240d and a wall portion 240b is provided to extend vertically from the end edge of the shallow bottom surface 240d toward the sliding surface 11.

The depth D2 of the second dynamic pressure generation groove 9 is shallower than the depth D4 (specifically, the depth of the deepest position (deepest portion) of the first dynamic pressure generation groove 240) of the first dynamic pressure generation groove 240. Additionally, a case in which the bottom surface 240*a* of the first dynamic pressure generation groove 240 is formed in a two-stage step shape has been illustrated, but the present invention is not limited thereto. For example, three stages or more may be used.

In addition, in the first embodiment to the third embodiment, the second dynamic pressure generation groove 9 has a constant depth D2 from the starting end 9A to the terminating end 9B, but the present invention is not limited thereto. For example, the bottom surface may be inclined so that the depth gradually becomes shallow from the starting end toward the terminating end or may be formed in a step shape or the like. That is, the depth of the deepest portion of the second dynamic pressure generation groove may be formed to be shallower than the depth of the deepest portion of the first dynamic pressure generation groove.

Fourth Embodiment

Next, a mechanical seal according to a fourth embodiment of the present invention will be described with reference to FIG. 10. In addition, the description of the configuration overlapping with the same configuration as that of the above-described embodiment will be omitted.

Figure 10:
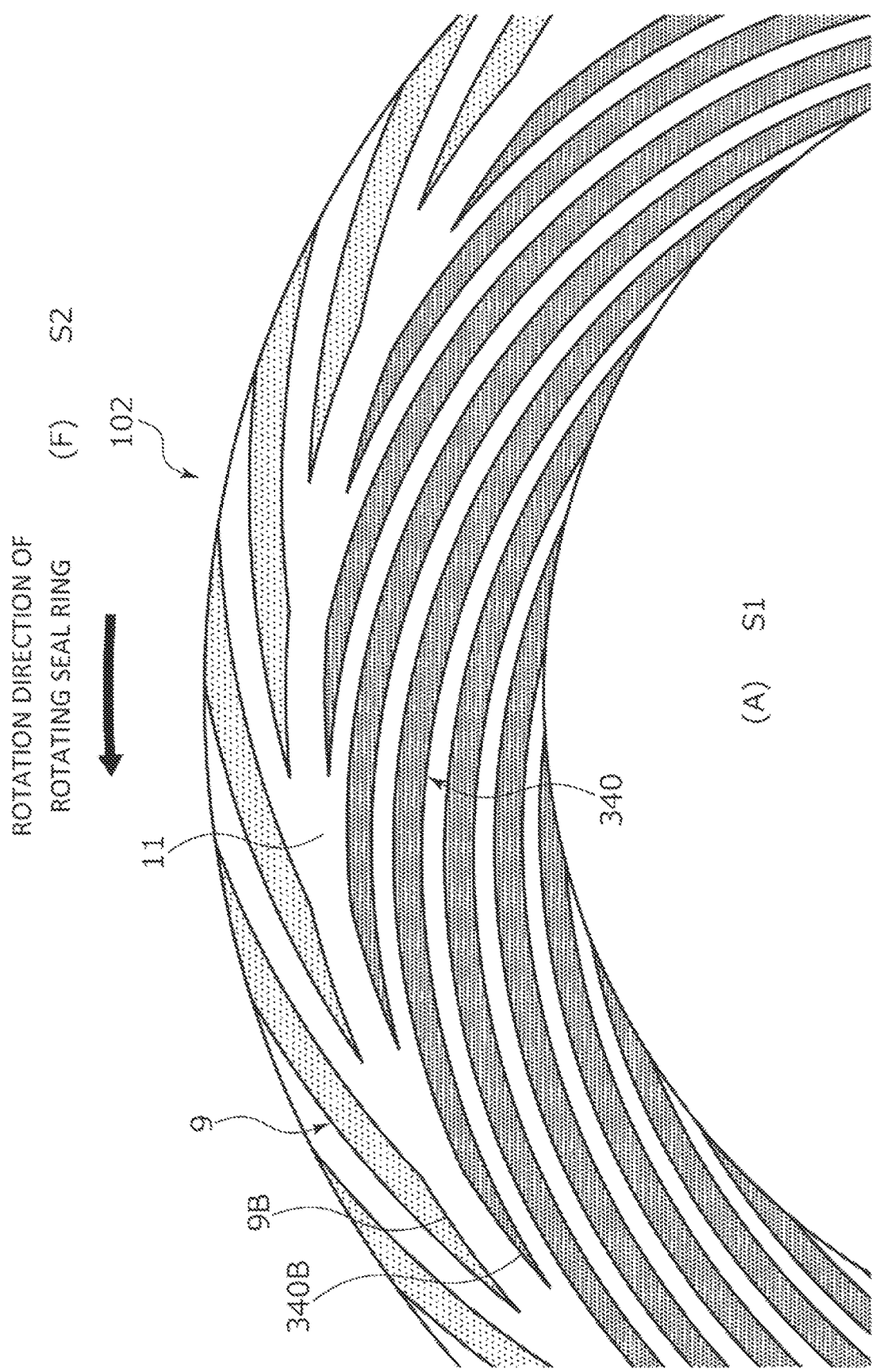
FIG. 10 is an explanatory diagram schematically showing an example of a mechanical seal according to a fourth embodiment of the present invention.

As shown in FIG. 10, a terminating end 340B of a first dynamic pressure generation groove 340 of a stationary seal ring 102 of this fourth embodiment overlaps the terminating end 9B of the second dynamic pressure generation groove 9 in the radial direction.

Accordingly, since the first force of the first dynamic pressure generation groove 340 and the second force of the second dynamic pressure generation groove 9 are generated at the radially overlapping position, it is possible to largely separate the sliding surfaces 11 and 21 in a short time and hence to quickly exhibit high lubricity between the sliding surfaces 11 and 21.

Fifth Embodiment

Next, a mechanical seal according to a fifth embodiment of the present invention will be described with reference to FIG. 11. In addition, the description of the configuration overlapping with the same configuration as that of the above-described embodiment will be omitted.

Figure 11:
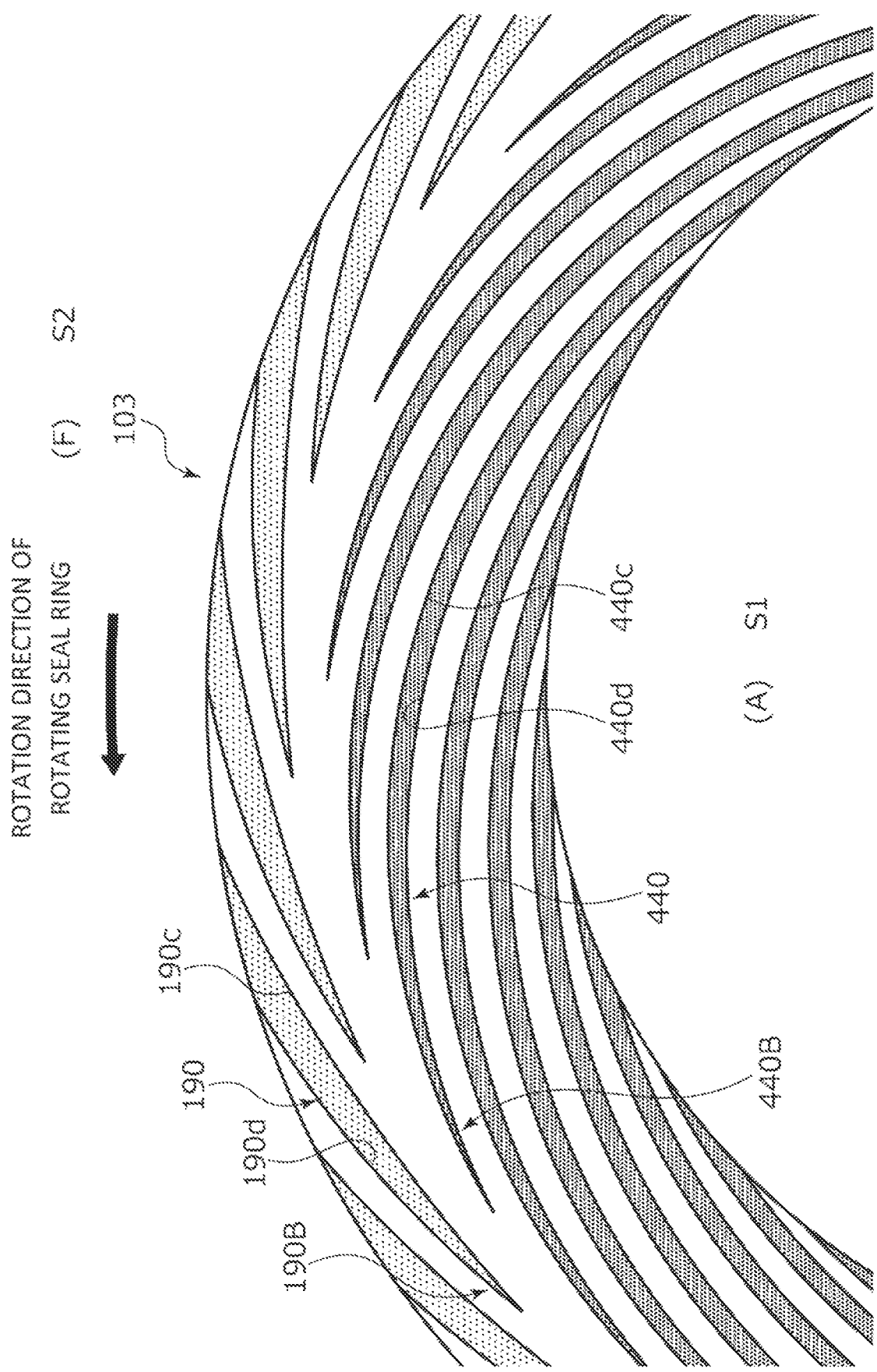
FIG. 11 is an explanatory diagram schematically showing an example of a mechanical seal according to a fifth embodiment of the present invention.

As shown in FIG. 11, in a first dynamic pressure generation groove 440 of a stationary seal ring 103 of this fifth embodiment, side wall portions 440*c* and 440*d* extend toward a terminating end 440B to approach each other and the terminating end 440B is tapered. Further, in a second dynamic pressure generation groove 190, side wall portions 190*c* and 190*d* extend toward a terminating end 190B to approach each other and the terminating end 190B is tapered.

Accordingly, the positive pressure is likely to be generated in the vicinity of the terminating end 440B of the first dynamic pressure generation groove 440 and the vicinity of the terminating end 190B of the second dynamic pressure generation groove 190 during the relative rotation of the rotating seal ring 20.

Although the embodiments of the present invention have been described with reference to the drawings, the specific configuration is not limited to these embodiments and is included in the present invention even if there are changes or additions within the scope of the present invention.

For example, in the above-described embodiments, as the sliding component, the mechanical seal for general industrial machines has been illustrated, but other mechanical seals for automobiles, water pumps, and the like may be used. Further, the present invention is not limited to the mechanical seal and may be a sliding component other than the mechanical seal such as a slide bearing.

Further, in the above-described embodiments, an example in which the first dynamic pressure generation groove and the second dynamic pressure generation groove are provided in the stationary seal ring has been illustrated, but the first dynamic pressure generation groove and the second dynamic pressure generation groove may be provided in the rotating seal ring.

Further, the sealing target fluid side has been described as the high pressure side and the leakage side has been described as the low pressure side. However, the sealing target fluid side may be the low pressure side, the leakage side may be the high pressure side, and the sealing target fluid side and the leakage side may have substantially the same pressure.

Further, in the above-described embodiments, an embodiment of the inside type that seals the sealing target fluid F tending to leak from the outer radial side of the sliding surface toward the inner radial side thereof has been illustrated, but the present invention is not limited thereto. For example, an outside type that seals the sealing target fluid F tending to leak from the inner radial side of the sliding surface toward the outer radial side thereof may be used.

Further, as shown in FIG. 2, the same number of the first dynamic pressure generation grooves and the second dynamic pressure generation grooves are provided on the sliding surface 11 of the stationary seal ring 10, but the present invention is not limited thereto. For example, the number may not be the same.

Further, a case has been illustrated in which the second dynamic pressure generation groove has a shorter extension length than that of the first dynamic pressure generation groove and is inclined along the circumferential direction and the radial center of the annular land portion 12*a* is on the outer radial side in relation to the radial center of the sliding surface 11, but the present invention is not limited thereto. For example, the first dynamic pressure generation groove may have a shorter extension length than that of the second dynamic pressure generation groove and may be inclined along the circumferential direction.

Further, a case in which the first dynamic pressure generation groove communicates with the inner space has been illustrated, but the present invention is not limited thereto. For example, the first dynamic pressure generation groove may not communicate therewith if the dynamic pressure can be generated.

Further, a case in which the second dynamic pressure generation groove communicates with the outer space has been illustrated, but the present invention is not limited thereto. For example, the second dynamic pressure generation groove may not communicate therewith if the dynamic pressure can be generated.

Further, a case has been illustrated in which the annular land portion 12*a* is provided between the first dynamic pressure generation groove and the second dynamic pressure generation groove and the first dynamic pressure generation groove and the second dynamic pressure generation groove are arranged to be separated from each other in the radial direction, but the present invention is not limited thereto. For example, the terminating end of the second dynamic pressure generation groove may be disposed on the inner radial side in relation to the terminating end of the first dynamic pressure generation groove and the terminating end of the first dynamic pressure generation groove and the terminating end of the second dynamic pressure generation groove may overlap each other in the circumferential direction.

Further, in this embodiment, the sealing target fluid F has been described as the high-pressure liquid, but the present invention is not limited thereto. For example, the sealing target fluid may be a gas or a low-pressure liquid or may be a mist in which a liquid and a gas are mixed.

Further, in this embodiment, the leakage side fluid has been described as the atmosphere A corresponding to the low-pressure gas, but the present invention is not limited thereto. For example, the sealing target fluid may be a liquid or a high-pressure gas or may be a mist in which a liquid and a gas are mixed.

Further, in the second and third embodiments, the depth of the dynamic pressure generation groove is defined as the depth of the deepest portion, but the depth of the dynamic pressure generation groove may be any depth as long as the depth substantially contributes to the generation of positive pressure.

REFERENCE SIGNS LIST

9 Second dynamic pressure generation groove
10 Stationary seal ring (sliding component)
11 Sliding surface
12a Annular land portion (land portion)
14 First dynamic pressure generation groove
14a Bottom surface
14b Wall portion
20 Rotating seal ring (opposed sliding component)
21 Sliding surface
A Atmosphere
D1, D2 Depth
F Sealing target fluid
F1 First force
F2 Second force
S1 Inner space
S2 Outer space
Y Levitation distance

The invention claimed is:

1. A sliding component formed in an annular shape and disposed at a relatively rotating position of a rotating machine and sliding relative to an opposed sliding component,
wherein a sliding surface of the sliding component is provided with a plurality of first dynamic pressure generation grooves disposed on a leakage side, having terminating ends, and generating a positive pressure and a plurality of second dynamic pressure generation grooves disposed on a sealing target fluid side, having terminating ends, and generating a positive pressure, and
wherein a depth of the second dynamic pressure generation groove is shallower than a depth of the first dynamic pressure generation groove.

2. The sliding component according to claim 1,
wherein each of the second dynamic pressure generation grooves communicates with a sealing target fluid side space.

3. The sliding component according to claim 2,
wherein an annular land portion having a predetermined radial width is continuously provided in a circumferential direction between the terminating ends of the first dynamic pressure generation grooves and the terminating ends of the second dynamic pressure generation grooves.

4. The sliding component according to claim 2,
wherein a radial center of the land portion is disposed on a side of the sealing target fluid with respect to a radial center of the sliding surface.

5. The sliding component according to claim 2,
wherein each of the terminating ends of the second dynamic pressure generation grooves is provided with a wall portion which extends from a bottom surface of each of the second dynamic generation grooves toward the sliding surface.

6. The sliding component claim 2,
wherein each of the second dynamic pressure generation grooves has an extension length smaller than an extension length of each of the first dynamic pressure generation grooves.

7. The sliding component according to claim 2,
wherein each of the second dynamic pressure generation grooves extends from the sealing target fluid side to the leakage side and is inclined in a circumferential direction.

8. The sliding component according to claim 7,
wherein each of the first dynamic pressure generation grooves extends from the leakage side to the sealing target fluid side and is inclined in the circumferential direction and each of the second dynamic pressure generation grooves is inclined along the circumferential direction compared to each of the first dynamic pressure generation grooves.

9. The sliding component according to claim 2,
wherein each of the second dynamic pressure generation grooves is disposed on an outer radial side of the sliding surface.

10. The sliding component according to claim 1,
wherein an annular land portion having a predetermined radial width is continuously provided in a circumferential direction between the terminating ends of the first dynamic pressure generation grooves and the terminating ends of the second dynamic pressure generation grooves.

11. The sliding component according to claim 10,
wherein a radial center of the land portion is disposed on a side of the sealing target fluid with respect to a radial center of the sliding surface.

12. The sliding component according to claim 10,
wherein each of the terminating ends of the second dynamic pressure generation grooves is provided with a wall portion which extends from a bottom surface of each of the second dynamic generation grooves toward the sliding surface.

13. The sliding component claim 10,
wherein each of the second dynamic pressure generation grooves has an extension length smaller than an extension length of each of the first dynamic pressure generation grooves.

14. The sliding component according to claim 10,
wherein each of the second dynamic pressure generation grooves extends from the sealing target fluid side to the leakage side and is inclined in a circumferential direction.

15. The sliding component according to claim 14,
wherein each of the first dynamic pressure generation grooves extends from the leakage side to the sealing target fluid side and is inclined in the circumferential direction and each of the second dynamic pressure generation grooves is inclined along the circumferential direction compared to each of the first dynamic pressure generation grooves.

16. The sliding component according to claim 1, wherein each of the terminating ends of the second dynamic pressure generation grooves is provided with a wall portion which extends from a bottom surface of each of the second dynamic generation grooves toward the sliding surface.

17. The sliding component claim 1, wherein each of the second dynamic pressure generation grooves has an extension length smaller than an extension length of each of the first dynamic pressure generation grooves.

18. The sliding component according to claim 1, wherein each of the second dynamic pressure generation grooves extends from the sealing target fluid side to the leakage side and is inclined in a circumferential direction.

19. The sliding component according to claim 18, wherein each of the first dynamic pressure generation grooves extends from the leakage side to the sealing target fluid side and is inclined in the circumferential direction and each of the second dynamic pressure generation grooves is inclined along the circumferential direction compared to each of the first dynamic pressure generation grooves.

20. The sliding component according to claim 1, wherein each of the second dynamic pressure generation grooves is disposed on an outer radial side of the sliding surface.

\* \* \* \* \*